(12) United States Patent
Halter et al.

(10) Patent No.: US 7,014,932 B2
(45) Date of Patent: Mar. 21, 2006

(54) DRAINAGE SYSTEM AND PROCESS FOR OPERATING A REGENERATIVE ELECTROCHEMICAL CELL SYSTEM

(75) Inventors: Dean Halter, West Hartford, CT (US); Spyros Nomikos, New Britain, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 513 days.

(21) Appl. No.: 10/249,156

(22) Filed: Mar. 19, 2003

(65) Prior Publication Data

US 2004/0185313 A1    Sep. 23, 2004

(51) Int. Cl.
*H01M 8/04* (2006.01)
*H01M 8/06* (2006.01)

(52) U.S. Cl. ............. 429/22; 429/19; 204/DIG. 4
(58) Field of Classification Search ............ 429/22
See application file for complete search history.

(56) References Cited

U.S. PATENT DOCUMENTS

| | | | |
|---|---|---|---|
| 5,346,778 A * | 9/1994 | Ewan et al. .......... | 429/19 |
| 5,376,470 A | 12/1994 | Sprouse ............. | 429/19 |
| 5,510,202 A * | 4/1996 | McCoy .............. | 429/19 |
| 6,887,601 B1 * | 5/2005 | Moulthrop et al. ..... | 429/17 |

* cited by examiner

*Primary Examiner*—Michael Barr
*Assistant Examiner*—Karie O'Neill
(74) *Attorney, Agent, or Firm*—Cantor Colburn LLP

(57) ABSTRACT

An electrochemical cell system comprises: a fuel cell module comprising a fuel cell outlet, an electrolysis module comprising an electrolysis water inlet in fluid communication with a water storage device and a hydrogen gas outlet in fluid communication with a hydrogen storage device, and a drainage system disposed downstream of the fuel cell hydrogen outlet and upstream of the water storage device and configured to remove water from the electrochemical cell system upon water within the water storage device attaining a selected level.

5 Claims, 4 Drawing Sheets

DRAINAGE SYSTEM AND PROCESS FOR OPERATING A REGENERATIVE ELECTROCHEMICAL CELL SYSTEM

BACKGROUND OF INVENTION

The present disclosure relates to electrochemical cells, and in particular to regenerative fuel cell systems.

Referring to prior art FIG. 1, a partial section of a typical proton exchange membrane fuel cell 100 is detailed. In fuel cell 100, hydrogen gas 112 and reactant water 114 are introduced to a hydrogen electrode (anode) 116, while oxygen gas 118 is introduced to an oxygen electrode (cathode) 120. The hydrogen gas 112 for fuel cell operation can originate from a pure hydrogen source, methanol, or other hydrogen source. Hydrogen gas electrochemically reacts at anode 116 to produce hydrogen ions (protons) and electrons, wherein the electrons flow from anode 116 through an electrically connected external load 121, and the protons migrate through a membrane 122 to cathode 120. At cathode 120, the protons and electrons react with the oxygen gas to form resultant water 114', which additionally includes any reactant water 114 dragged through membrane 122 to cathode 120. The electrical potential across anode 116 and cathode 120 can be exploited to power an external load.

The same configuration as is depicted in FIG. 1 for a fuel cell can be employed for electrolysis cells. In a typical anode feed water electrolysis cell (not shown), process water is fed into a cell on the side of the oxygen electrode (in an electrolytic cell, the anode) to form oxygen gas, electrons, and protons. The electrolytic reaction is facilitated by the positive terminal of a power source electrically connected to the anode and the negative terminal of the power source connected to a hydrogen electrode (in an electrolytic cell, the cathode). The oxygen gas and a portion of the process water exit the cell, while protons and water migrate across the proton exchange membrane to the cathode where hydrogen gas is formed. In a cathode feed electrolysis cell (not shown), process water is fed on the hydrogen electrode, and a portion of the water migrates from the cathode across the membrane to the anode where protons and oxygen gas are formed. A portion of the process water exits the cell at the cathode side without passing through the membrane. The protons migrate across the membrane to the cathode where hydrogen gas is formed.

The typical electrochemical cell includes one or more individual cells arranged in a stack, with the working fluid directed through the cells via input and output conduits formed within the stack structure. The cells within the stack are sequentially arranged, each including a cathode, a proton exchange membrane, and an anode. In certain conventional arrangements, the anode, cathode, or both are gas diffusion electrodes that facilitate gas diffusion to the membrane. Each cathode/membrane/anode assembly (hereinafter "membrane electrode assembly", or "MEA") is typically supported on both sides by flow fields comprising screen packs or bipolar plates. Such flow fields facilitate fluid movement and membrane hydration and provide mechanical support for the MEA. Since a differential pressure often exists in the cells, compression pads or other compression means are often employed to maintain uniform compression in the cell active area, i.e., the electrodes, thereby maintaining intimate contact between flow fields and cell electrodes over long time periods.

In certain arrangements, the electrochemical cells can be employed to both convert electricity into hydrogen, and hydrogen back into electricity as needed. Such systems are commonly referred to as regenerative fuel cell systems.

A typical regenerative fuel system generally includes an electrolyzer stack in fluid communication with a fuel cell stack or it may include a reversible electrolyzer/fuel cell stack. In the electrolysis mode, i.e., charging mode, electrical power supplies energy to the electrolyzer to produce hydrogen gas by electrolyzing water, which may then be stored or used in the fuel cell. In the fuel-cell mode, i.e., discharge mode, the stored hydrogen is combined with air to generate electrical power and water. The water is then recycled back to a water storage vessel. During use of the regenerative fuel system, there may be periods where the fuel cell is operated for prolonged periods of time. Operating in the fuel cell mode for prolonged periods of time may use hydrogen supplied from other than the electrolysis cell and may produce excess by-product water. Since the size of the water storage vessel employed in regenerative fuel systems is generally limited, excess production of water during fuel cell operation can reach the maximum capacity of the vessel.

SUMMARY OF INVENTION

Disclosed herein are a regenerative electrochemical cell system and a process for operating the system. In one embodiment, the electrochemical cell system comprises: a fuel cell module comprising a fuel cell outlet, an electrolysis module comprising an electrolysis water inlet in fluid communication with a water storage device and a hydrogen gas outlet in fluid communication with a hydrogen storage device, and a drainage system disposed downstream of the fuel cell hydrogen outlet and upstream of the water storage device and configured to remove water from the electrochemical cell system upon water within the water storage device attaining a selected level.

In another embodiment, the electrochemical cell system comprises: a fuel cell module comprising a fuel cell outlet comprising a first conduit in fluid communication with a water storage device, an electrolysis module comprising an electrolysis water inlet in fluid communication with the water storage device, and a drainage system disposed downstream of the fuel cell hydrogen outlet and configured to remove water from the electrochemical cell system, wherein the drainage system comprises a conduit in fluid communication with the water storage device and at least one of a drain and a holding tank, wherein the conduit has a first end disposed at or about an upper portion of the water storage device and a second end in fluid communication with the drain or holding tank.

In one embodiment, the method for operating an electrochemical cell system, comprises: introducing feed hydrogen from a hydrogen storage system to a fuel cell hydrogen electrode and introducing oxygen to a fuel cell oxygen electrode, generating electricity and byproduct water, directing the byproduct water to a water storage device; and diverting all or a portion of the byproduct water to a drain or to a holding tank when a byproduct water level reaches a selected level within the water storage device.

The above described and other features are exemplified by the following figures and detailed description.

BRIEF DESCRIPTION OF DRAWINGS

Referring now to the figures, which are exemplary embodiments and wherein the like elements are numbered alike.

DETAILED DESCRIPTION

A regenerative fuel cell system and a process for operating the system are described. The regenerative fuel cell system comprises a drainage system for accommodating excess production of water during prolonged operation of a fuel cell employed in the regenerative fuel system. As used herein, the term "prolonged" is arbitrarily used and depends on numerous factors including, but not limited to, the capacity and number of water storage devices employed in the system, the number of fuel cells employed, hydrogen capacity, configuration of the system, and the like. The drainage system described herein prevents system shut down due to overproduction of water from operation of the fuel cell or otherwise. As will be described in greater detail, in one embodiment, the drainage system is preferably disposed intermediate to the fuel cell outlet and a water storage device adapted to receive water produced by the fuel cell. In another embodiment, the drainage system is disposed at the water storage device.

Figure 1:
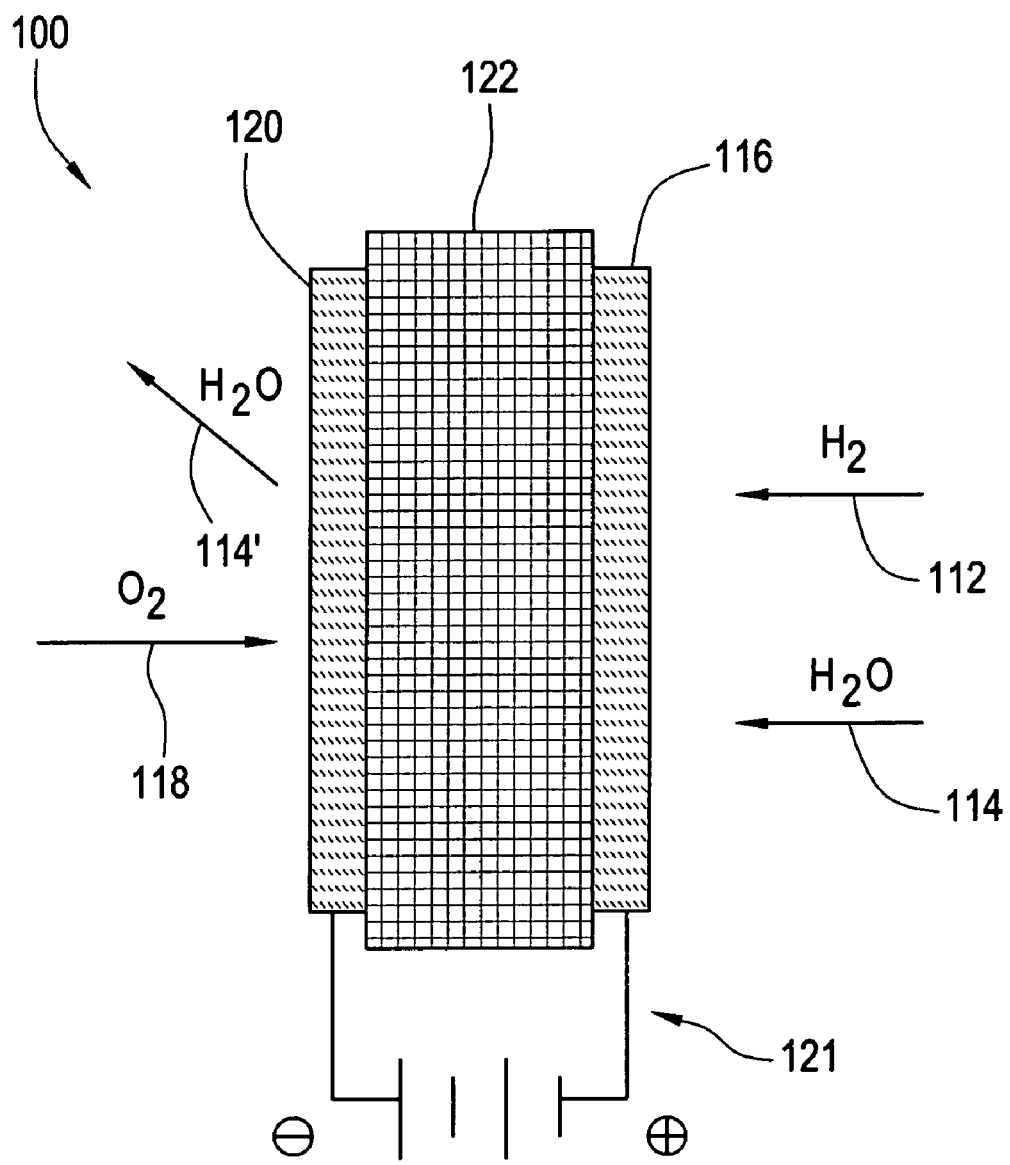
FIG. 1 is a schematic diagram illustrating a prior art electrochemical fuel cell.
Figure 2:
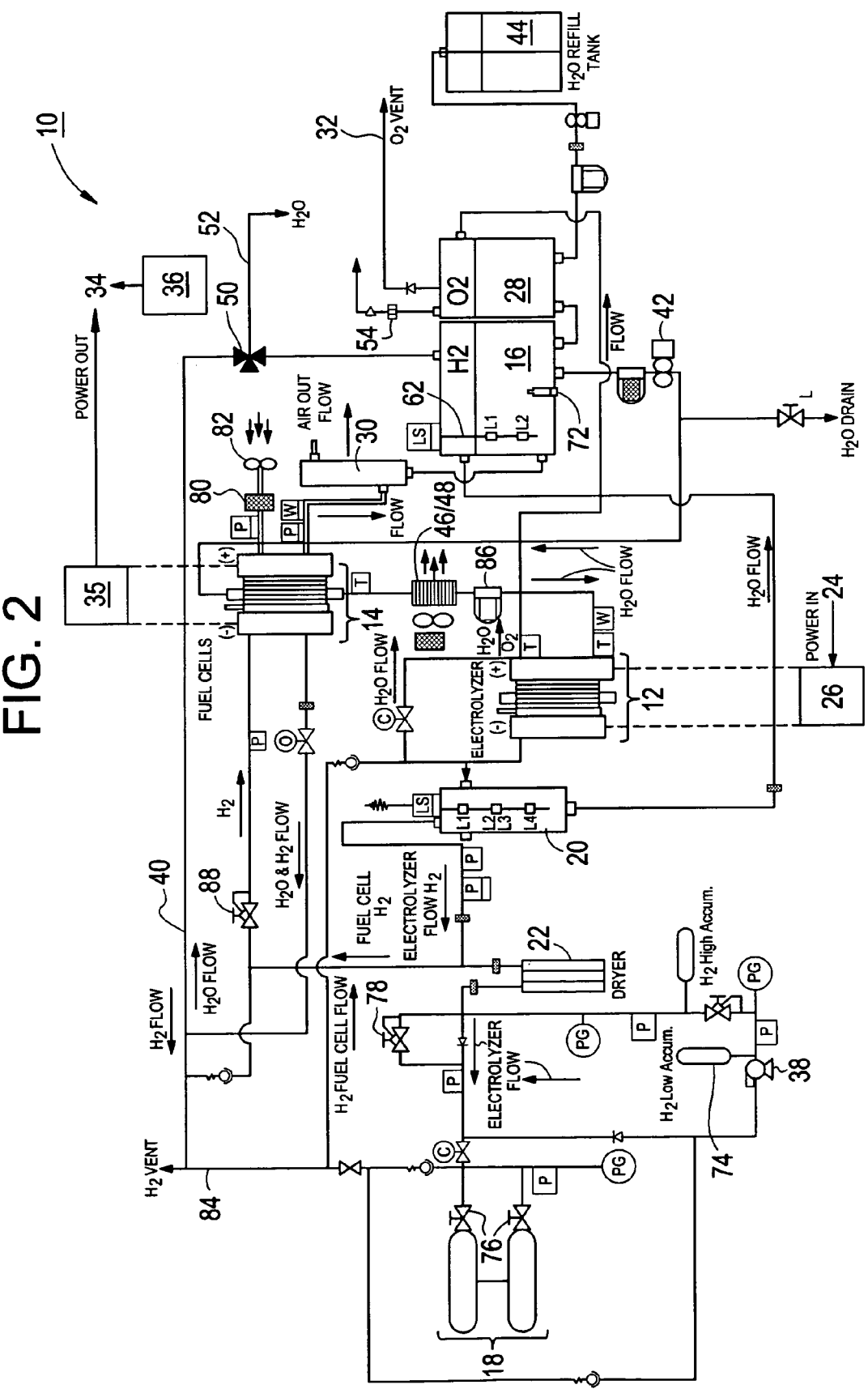
FIG. 2 is a schematic diagram illustrating an exemplary regenerative fuel cell system.

FIG. 2 is a schematic diagram representing an exemplary regenerative fuel cell system suitable generally designated by reference numeral 10. The system 10 generally comprises an electrolysis module 12, a fuel cell module 14, a water storage device 16, and a hydrogen storage device 18. The electrolysis module 12 is used to generate hydrogen gas by electrolysis of water, which is then stored in the hydrogen storage device 18 or fed to the fuel cell module 14. The fuel cell module 14 is used to generate energy during a power generation mode. During the power generation mode, a control valve (not shown) is actuated (and preferably left open while in idle mode), and hydrogen gas flows from the storage device 18 to the fuel cell module 14. Hydrogen gas electrochemically reacts with oxygen ($O_2$) in the fuel cell module 14 to release energy in the form of electricity and to form byproduct water. The byproduct water is directed to the water storage device 16.

As shown, water storage device 16 is in fluid communication with the cathode (+) chamber of electrolysis module 12. An additional water storage device 28 may also be disposed in fluid communication with water storage device 16. On the anode (−) side of the electrolysis module 12, hydrogen storage devices 18 are in fluid communication with the electrolysis module 12, with an optional phase separation device 20 disposed therebetween. The hydrogen storage device 18 is further in fluid communication with the fuel cell module 14, preferably via dryer 22.

The electrolysis module 12 can comprise any desired number of electrolysis cells, depending upon the desired rate of hydrogen production. Each electrolysis cell generally comprises an electrolyte disposed between and in ionic communication with electrodes. One of the electrodes is in fluid communication with the water source (e.g., water storage devices 16, 28), while the other electrode is in fluid communication with the fuel cell module 14, preferably via the phase separation device 20 and the hydrogen storage devices 18. The electrolysis module 12 further comprises electrical communication with a power source 24, optionally via a power conditioner 26.

The fuel cell module 14 is in fluid communication with the surrounding atmosphere via an oxygen/water phase separation device 30, the water storage device 28, and an oxygen vent 32. In addition, the fuel cell module 14 is in electrical communication with a power load 34, and optionally in electrical communication with a bridge power device 36 (not shown), which is also in electrical communication with the power load 34. The power source 24 servicing the electrolysis module 12 and the bridge power device 36 preferably comprises a single device.

The water source, e.g., water storage devices 16, 28, contains a water intake port and a water output port. The water intake port is in fluid communication with the fuel cell module 14 via conduit 40 and the output port is in fluid communication with a water pump 42 that is in fluid communication with the electrolysis module 12. Depending upon the design of the water storage device, a single water storage device can be employed to recover water from the hydrogen and the oxygen outlets from the fuel cell module 14, or a plurality of water storage devices (e.g., 16, 28) can be employed and configured, for example, as shown. Furthermore, depending upon the availability of make-up water for the system, a backup water storage device 44 may also be employed.

As noted, conduit 40 provides fluid communication from the outlet of the fuel cell module 14 to an inlet of the water storage devices 16, 28. As will be described in greater detail, during operation of the fuel cell module, water is generated as a byproduct of an electrochemical reaction to produce electricity. The byproduct water flows through conduit 40 to the water storage device 16. Disposed within conduit 40, downstream of the outlet of the fuel cell module 14 and upstream of the water storage device 16, is the drainage system. In one embodiment, a three-way valve 50 is disposed in conduit 40 intermediate to the fuel cell module 14 and the water storage device 16. As water in the water storage device 16 reaches a selected capacity (e.g., reaches or exceeds a maximum volume capacity), the three-way valve 50 diverts all or a portion of the subsequent by product water produced (e.g., the excess water) to drain conduit 52. Since the water storage devices 16, 28 have a limited volume capacity, water in excess of the volume capacity can travel via drain conduit 52 to a drain or optionally, may be diverted to a holding tank (e.g., 44) for later use. Advantageously, the drainage system disposed in conduit 40 prevents system failure and/or flooding due to prolonged operation of the fuel cell module such that volume capacity of the water storage device is exceeded.

Figure 3:
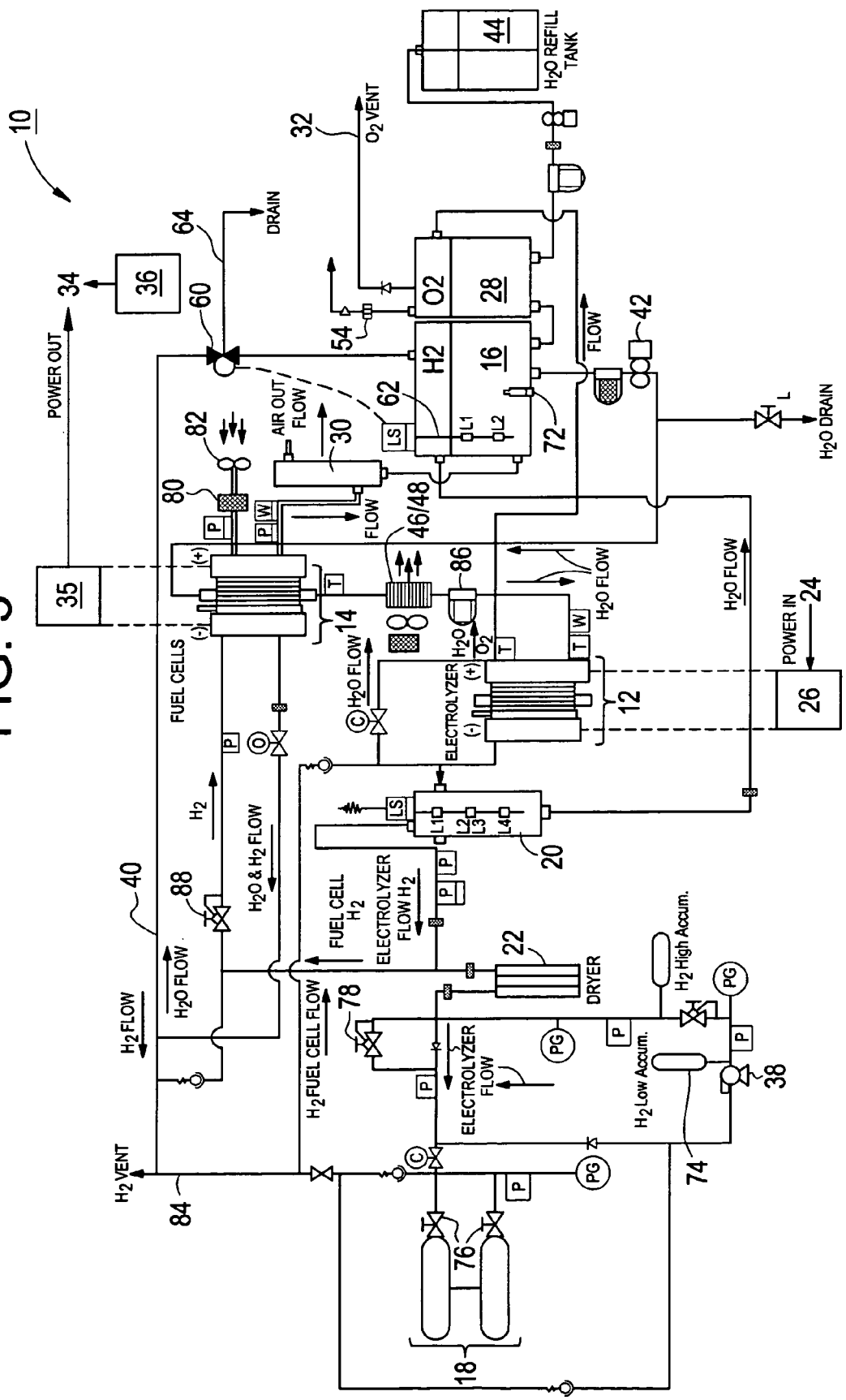
FIG. 3 is a schematic diagram illustrating another exemplary regenerative fuel cell system.

Referring now to FIG. 3, an alternative drainage system includes an actuator valve 60 in operative communication with a level sensor 62 disposed within the water storage device 16 and/or 28. During operation, if the water volume within the water storage device 16 and/or 28 reaches and exceeds a set level determined by programming the level sensor, the excess water is diverted by actuation of valve 60. The diverted water flows into conduit 64 to a drain, a holding tank (e.g., 44), or the like.

Figure 4:
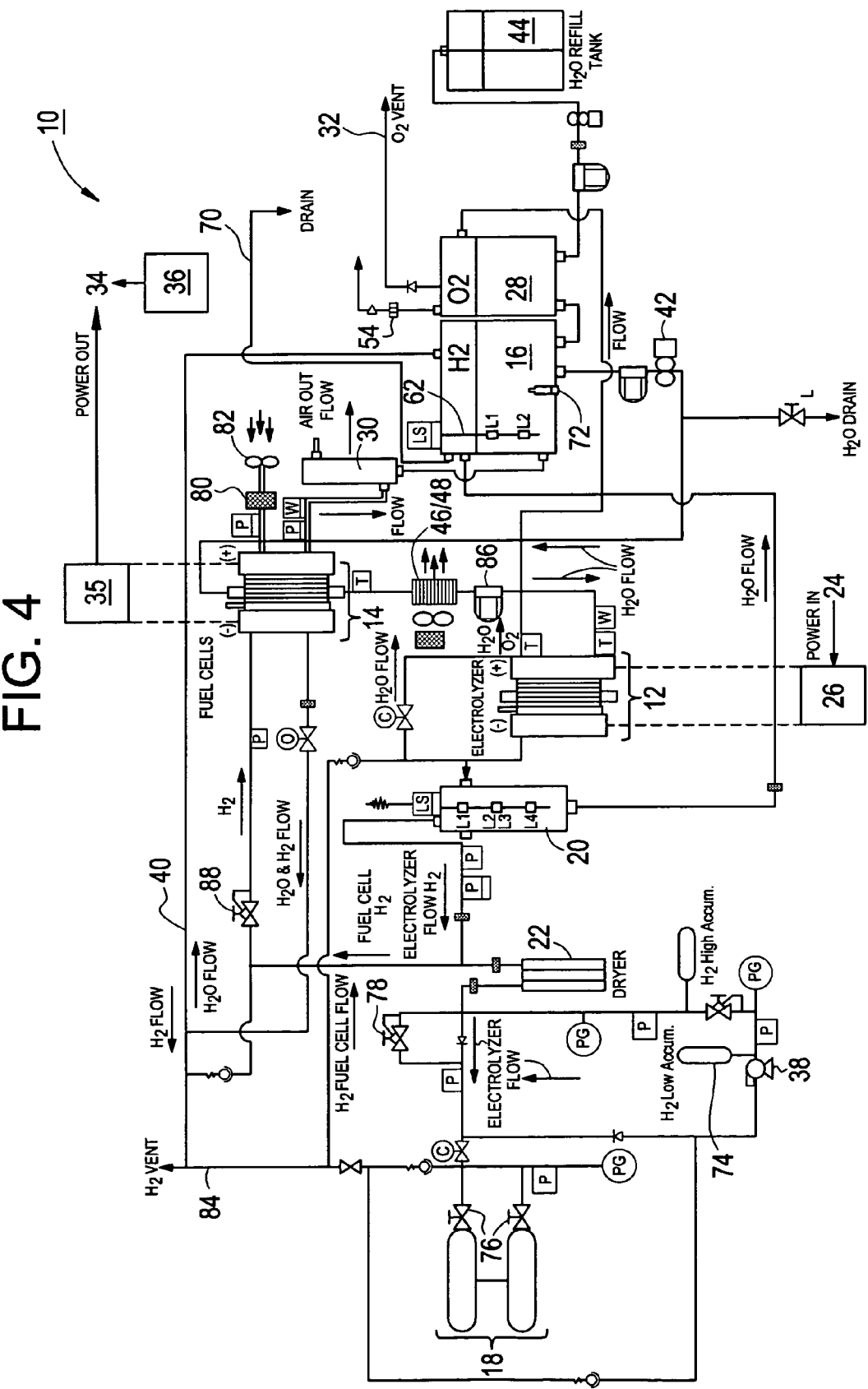
FIG. 4 is a schematic diagram illustrating yet another exemplary regenerative fuel cell system.

In another embodiment, as shown more clearly in FIG. 4, a drain conduit 70 is disposed in direct fluid communication with the water storage device 16 and/or 28. Preferably, the drain conduit 70 is positioned at or about an upper portion of the water storage device 16 and/or 28 to provide fluid communication with an interior of the water storage device. The drain conduit 70 may be disposed in a sidewall or in a top surface of the water storage device. In this manner, as water in the water storage device 16 and/or 28 reaches a maximum desired capacity (e.g., about maximum volume capacity), excess water can be diverted from the water storage device to prevent system shut down and/or flooding. As previously described, the excess water can be diverted to a drain, to a holding tank (e.g., 44), or the like.

The water system, i.e., the water storage devices, and any of the fluid communication conduits may further include a heating system to increase the temperature of the water, thereby reducing fuel cell startup time. For example, a resistance-type heating element 72 may be disposed in water storage device 16 or a heater may be incorporated in an element of the fuel cell module 14 or the electrolysis module 12 in the form of integrated components (not shown) with the heating element forming part of an end plate or fluid communication section of the module. The heater may also utilize a radiant heating source such as an infrared source within the system or may be externally located.

In addition to the above components, the regenerative electrochemical cell system 10 may further include the water pump 42 that is disposed downstream from water storage devices 16, 28. Water pump 42, which is preferably in fluid communication with the electrolysis module 12, e.g., via the fuel cell module 14 (e.g., the water is optionally employed as a heat exchange fluid in the fuel cell prior to being a reactant in the electrolysis cell), is preferably capable of discharging the desired amount and flow of water to the electrolysis module 12 at a pressure sufficient to enable efficient system operation. For example, the water pump 42 is preferably capable of discharging water to the electrolysis module 12 at a pressure up to and exceeding about 2.1 megaPascals (MPa) (300 pounds per square inch (psi)).

The water storage device 28 may also include dryer 54. The optional dryer 54 enables the removal of water vapor from the oxygen purge stream that may also comprise other air components (e.g., nitrogen, carbon dioxide, and the like).

As with the water storage device 16 and the water pump 42, the hydrogen storage device 18 is in fluid communication with the electrolysis module 12. The hydrogen storage device 18 comprises a hydrogen gas intake port and a hydrogen gas output port. The hydrogen gas intake port is in fluid communication with electrolysis module 12, while the hydrogen gas output port is in fluid communication with the fuel cell module 14. Preferably, the hydrogen storage device 18 is a pressurized device suitable to store hydrogen gas at pressures of up to, or exceeding, about 2,000 pounds per square inch (psi) with capability of storing hydrogen gas at pressures of up to, or exceeding about 10,000 psi more preferred.

The desired hydrogen storage pressure may be achieved through the use of the electrolyzer alone or in concert with a pressure boosting system (e.g., a compressor 38 or the like). Alternatively, or in addition, the hydrogen storage device 18 may include mechanical or other pressure increasing methods, including a metal hydride pumping or proton exchange membrane (PEM) based pumping systems. Any pumping system may use a single stage or multiple stages to achieve final compression level. The compression techniques may be used in various combinations or quantity to achieve the required compression within the system.

In an alternative to employing pressurized hydrogen storage devices 18, the devices can employ other techniques of storing hydrogen; e.g., hydrogen can be stored in the form of a gas, solid, or liquid. For example, if a pressurized tank is employed, the hydrogen can be stored as a compressed gas. If a non-pressurized device is employed the hydrogen can be stored as a solid, e.g., as a metal hydride, in a carbon based storage (e.g. particulates, nanofibers, nanotubes, or the like), and others, as well as combinations comprising at least one of the foregoing storage forms.

Hydrogen gas drying techniques may be employed as part of the hydrogen storage system. These drying systems may include, for example, desiccant based drying schemes (e.g., a swing bed adsorber, and other desiccant based absorbers, and the like), phase separators, membrane drying systems (e.g., palladium diffusers, and the like), coalescing filters, condensing systems (e.g., utilizing thermal electric cooler, vortex tube coolers, vapor or air cycle refrigeration system, and the like), and the like, as well as combinations comprising at least one of the foregoing drying systems. Alternatively, an inverted hydrogen storage device can be employed, i.e., a hydrogen storage tank comprising a bi-directional opening (inlet and outlet), and/or which allows hydrogen removal from an upper vessel connection, while water is removed via a gravity drain port. Employing the inverted hydrogen storage device eliminates the need for a dryer and associated hardware. Further eliminated is the need for a compressor 38 if the electrolysis module 12 is operated to produce hydrogen at a desired storage pressure.

In fluid communication with the hydrogen storage device 18 are optional dryer(s) 22, and the fuel cell module 14. The dryer 22 can comprise any device capable of removing water vapor from the hydrogen stream. Some water is removed from the saturated hydrogen stream at the phase separator 20. Saturated hydrogen gas from the phase separator then flows into dryer 22 (having a lower water saturation than the feed stream to separator 20). The dryer 22 includes a bed of a moisture absorbent (and/or adsorbent) material, i.e., a desiccant. As the saturated hydrogen gas flows into the dryer 22, water with trace amounts of hydrogen entrained therein is removed and subsequently returned to the water source through a low-pressure hydrogen separator 74. Low pressure hydrogen separator 74 allows hydrogen to escape from the water stream due to the reduced pressure, and also recycles water to power source 24 at a lower pressure than the water exiting the phase separation device 20. Alternatively, a diffuser may be provided in addition to the dryer 22.

Various other equipment employed in the regenerative electrochemical cell system 10 may include additional valves (e.g., relief valves, check valves, manual valves, actuated valves, needle valves, and the like, as well as combinations comprising at least one of the foregoing valves), filters (e.g., deionization bed cartridge(s), filter cartridge(s), and the like, as well as combinations comprising at least one of the foregoing filters), sensors (e.g., pressure, temperature, flow, humidity, conductivity, gas mixture, water level, and the like, as well as combinations comprising at least one of the foregoing sensors), controls (e.g., temperature (such as, heaters, heat exchangers, coolers, driers, and the like), pressure (such as, compressors, and the like), flow (such as, pumps, fans, blowers, and the like), power, and the like, as well as combinations comprising at least one of the foregoing controls), conduits (e.g., fluid conduits, electrical conduits, and the like), and the like, as well as combinations comprising at least one of the foregoing equipment. It should be noted that, depending upon system location (remote, metropolitan, industrial, and the like), its specific function (e.g., front line electrical production, backup production), and the criticality of the source that the system is backing-up, redundant components or merely additional components can be employed, in parallel or series operation. For example, additional water storage devices, driers, heat exchanger, radiators, deionization beds, filters, phase separation tanks, and the like.

During operation of the regenerative electrochemical cell system 10, stored hydrogen from hydrogen storage device 18 is fed into fuel cell module 14, preferably via pressure regulator 78 and drier 22. Air from the surrounding atmosphere is directed to the fuel cell module 14 via filter 80 and fan 82. Optionally, the air can be compressed prior to entering the fuel cell module 14 to attain the desired air pressure. Within the fuel cell module 14, the hydrogen and the air electrochemically react to generate electricity, and byproduct water. The byproduct water flows via conduit 40 to the water storage device 16. Excessive amounts of byproduct water are diverted by the drainage system as previously described.

The electricity generated by the fuel cell is directed from the system 10 to a power load 34 through power conditioner 35. Meanwhile, cathode exhaust, i.e., excess air and byproduct water are directed to the water storage device 16 via the phase separation device 30. Optionally, the oxygen separated from the water/air stream can be retained in water storage device 28 for use in the fuel cell module 14 (e.g., to reduce start-up time), or can be vented via vent 32 to the surrounding atmosphere. Similarly, the hydrogen and water from the fuel cell anode exhaust is directed from the fuel cell module 14 to the water storage 16, with excess hydrogen, as well as nitrogen that may have migrated across the electrolyte, optionally being vented via vent 84.

To enhance the water recovery, i.e., to minimize this water loss, one or more dehumidifiers may be added to the system. The dehumidifier serves to re-condense and hence recapture water vapor prior to venting. Dehumidification of vented gases may also be utilized on the air/water stream from the cathode side of the fuel cell module 14 to preserve total system water volume. This dehumidification would take place on the outlet of the fuel cell at the exhaust air port. In one embodiment, a separate phase separator (e.g., an air/water phase separator 30) may collect recovered water. The water can then be pumped or gravity fed to the electrolysis module 12. Alternatively, all or a portion of the recovered water, may be directed to the water storage device 16.

The water reclamation system may partially or completely employ heat exchange with the surrounding atmosphere (e.g., ambient air), may employ another fluid available to the system, may create a cold condensing surface using active refrigeration (e.g., thermal electric cooler, air cycle refrigeration, vapor cycle refrigeration, and the like), and the like, as well as combinations comprising at least one of the foregoing thermal transfer techniques. For example, the heat exchange may use pressurized air exiting the fuel cell by passing the air through a vortex tube cooler. The air cools producing a cold air stream and a hot air stream, wherein the hot air stream is vented to the surrounding atmosphere while the cold air steam is used to condense water in the air stream. The condensed water and air exiting the cooler is then separated in a water/air phase separator. One example of the vortex tube is Exair Corporation Vortex Tube Model 3202 fitted with cold muffler model 3905 and hot muffler 3903; other options or combinations that yield the required cold air source may be used.

The reclaimed water is preferably directed to one of the water storage devices 16, 28, accordingly. These water storage devices 16, 28 store the water and preferably provide phase separation to separate additional hydrogen or oxygen from the liquid water phase. The water storage device 16 preferably receives condensed water from the phase separation device 20, and from the phase separation device 30, while the water storage device 28 preferably receives the water/oxygen stream exiting from the anode side of the electrolysis module 12.

When power is available, or when power use is desired (e.g., in peak-shave type applications), the electrolysis module 14 can be operated to provide hydrogen gas directly to the fuel cell module 14 or to replenish the hydrogen storage device 18. Electrolysis module operation comprises directing water to the electrolysis module 12. Water can be introduced to the electrolysis module 12 directly from the water storage device 16, or can be introduced to the electrolysis module 12 via the fuel cell module 14. Preferably, water from the water storage device 16 passes through the fuel cell module 14, hydrating the electrolyte, and into a heat exchanger/radiator 46/48. From the heat exchanger/radiator 46/48, the water passes through an optional deionization bed 86 and into the anode of the electrolysis module 12 where the power supplied to the electrolysis cell via power source 24 and optional power conditioner 26 enables the disassociation of the water to hydrogen ions and oxygen gas at the anode. The oxygen gas, along with excess water are directed to the phase separation device 30, while the hydrogen ions, and some water, migrate across the electrolyte to the cathode where the hydrogen ions form hydrogen gas. From the electrolysis module 12, the hydrogen gas and water can be directed to an optional phase separation device 20, and then the hydrogen can either be directed to the fuel cell module 14, or to an optional drier 22 (e.g., dehumidifier, or the like) and into the hydrogen storage device 18. Depending upon the desired storage pressure of the hydrogen and the hydrogen side pressure of the electrolysis module 12, a compressor 38 may optionally be employed to increase the hydrogen pressure prior to introduction to the hydrogen storage device. Additionally, pressure reducing devices and associated accumulation tanks may be used to stabilize and regulate to inlet pressure to the compressor.

A second pressure regulator 88 can be fluidly connected to the fuel cell inlet. The pressure regulator is set at the optimal operating pressure of the fuel cell, e.g., the second pressure regulator 88 can be set at about 40 psi or so. The pressure regulator 88 protects the fuel cell from the high pressures obtained during hydrogen gas generation (pressures up to and exceeding about 4,000 psi) and acts as a secondary pressure reducer. The regulator 88 also serves as a redundant mechanism in the event of a check valve fault or leak.

As previously discussed, pressure regulator 78 is preferably set at a pressure rating above the rating for pressure regulator 88 (e.g., a few psi greater than the pressure rating for regulator 88). Under these conditions, the pressure-regulator 78 can function as a backup to pressure regulator 88 in the event of a "wide open" fault of regulator 88. Moreover, since pressure regulator 78 is set at a value greater than the regulator 88, pressure is continuously maintained to the fuel cell module 14, even during electrolysis. Since it is preferred to employ no shutoff or multi-way valves between the hydrogen storage device 18 and fuel cell module 14 that need to be actuated, the fuel cell is always ready to operate. A shutoff valve 90, normally disposed between the hydrogen storage device 18 and the dryer 22, is open when the system is operational and is only closed for system faults or system shutoff. As a result, the switching delays caused due to valve actuation are eliminated as the system cycles between the charging/storage mode (e.g., hydrogen generation) and the power generation mode. During the power generation mode, the use of pressure regulator 78 causes a low pressure purging gas to flow into dryer 22 and desorb the bed of accumulated moisture. This permits the system to employ lower cost phase separators 20 and to optionally eliminate the check valves at the separator outlet. Use of the low-pressure phase separator is particularly preferred when the system employs a hydrogen pressure boosting system (e.g., a compressor, or the like), due to its low cost.

From the dryer 22, hydrogen flows to the fuel cell module 14. The fuel cell module 14 comprises any desired number of fuel cells, based upon the desired power supply capabilities of the system. Each fuel cell module 14 comprises an electrolyte disposed between and in ionic communication with two electrodes. One electrode is in fluid communication with a hydrogen supply (e.g., hydrogen storage device 18 and/or electrolysis module 12), while the other electrode is in fluid communication with an oxygen supply (e.g., the surrounding atmosphere, the gaseous phase of the water storage device 28, the gaseous phase of the oxygen/water phase separation device 30, and/or an oxygen storage tank (not shown)).

If the fuel cell module 14 is in fluid communication with the surrounding atmosphere, reduction of any pressure differentials between the fuel cell module 14 and the surrounding atmosphere, as well as uptake of air from the surrounding atmosphere, and filtering of the air, can be accomplished by various methods, including, for example, using an air compressor(s), fan(s), filter(s), and the like, as well as combinations comprising at least one of the foregoing. The fuel cell module 14 operates until the hydrogen source is depleted or other control system inputs indicated that power generation is no longer desired.

In electrical communication with the fuel cell module 14 is power load 34. The power load 34 can be a direct current (DC) load or an alternating current (AC) load and can include those discussed above, e.g., residential, commercial, and the like (including batteries for powering those power loads) with the electricity from the fuel cell module 14 appropriately conditioned by optional power conditioner 35. Furthermore, the system can be connected directly to the load with sensors capable of drawing power upon the various conditions, e.g., cease of grid power flow, increased power demand over a predetermined amount, operation for system testing, commands from centralized or distributed control systems (e.g., connected via various methods including wireless, wired (e.g., modem, and the like)), infrared and radio frequency commands, and the like, as well as combinations comprising at least one of the foregoing command systems. These command systems may further include operations devices in operable communication with the system, such as communication devices and control devices. Possible operations devices include processing units (e.g., computers, and the like) and similar equipment.

In contrast to the fuel cell module 14, the electrolysis module 12 is connected to a power source 24. The power source can be any device capable of providing sufficient power to the electrolysis module 12 to enable the desired hydrogen production rate. Some possible power sources 24 include grid power, solar power, hydroelectric power, tidal power, wind power, and the like, as well as combinations comprising at least one of the foregoing power sources (e.g., via solar panel(s), wind mill(s), dams with turbines, and the like).

The power sources can introduce either AC or DC power to the system, preferably via an optional power conditioner 26. The power conditioner 26 may provide control of the energy source, e.g., current control, voltage control, switch control, as well as combinations comprising at least one of these controls, and the like. The power conditioner 35, and/or the control system (not shown), can monitor voltage, current, or both, in order to control the power from the power conditioner 35.

In addition to the power that passes out of the system via the power load 34, heat energy may be recovered from the system with a heat exchanger 46 and/or radiator 48. The heat exchanger can be disposed in fluid communication with both the fuel cell module 14 and the electrolysis module 12 such that the heat produced in the electrolysis module 10 can be employed to heat the fuel cell module 14. Alternatively, or in addition, the heat can be in thermal communication with the surrounding environment, or can be directed to a thermal load; e.g., a building (such as an office building(s), house(s), shopping center, factory(ies) and the like).

Advantageously, the regenerative fuel system 10 prevents system shutdown and/or flooding due to excessive production of water during operation thereof. During extended use of the fuel cell system, additional hydrogen (e.g., in addition to the hydrogen in hydrogen storage device 18 and that produced by the electrolysis module 12) can be introduced into the system. This excess hydrogen can result in the production of excess water (e.g., beyond the capacity of the water storage device 16), which can result in system shutdown. Due to the employment of the drainage system (e.g., valves 50,60,70 and lines 54,64,74, as well as associated sensors and the like), the system is made robust and capable of continuous operation even with the introduction of additional hydrogen and the production of excess water. The system is self regulating.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An electrochemical cell system, comprising:
   a fuel cell module comprising a fuel cell outlet;
   an electrolysis module comprising an electrolysis water inlet in fluid communication with a water storage device and a hydrogen gas outlet in fluid communication with a hydrogen storage device; and
   a drainage system disposed downstream of the fuel cell hydrogen outlet and upstream of the water storage device and configured to remove water from the electrochemical cell system upon water within the water storage device attaining a selected level.

2. The electrochemical cell system according to claim 1, wherein the drainage system comprises a three-way check valve configured to divert water a conduit in fluid communication with at least one of a drain and a holding tank.

3. The electrochemical cell system according to claim 1, wherein the drainage system comprises an actuator valve in fluid communication with the conduit and a level sensor disposed within the water storage device and in operative communication with the actuator valve, wherein the actuator valve diverts a volume of water in response to a signal from the level sensor.

4. The electrochemical cell system according to claim 1, further comprising a hydrogen storage device comprising carbon based storage.

5. The electrochemical cell system according to claim 1, wherein the carbon based storage is selected from the group consisting of particulates, nanofibers, nanotubes, and combinations comprising at least one of the foregoing carbon based storage.

* * * * *